US006195233B1

United States Patent
Akiyama et al.

(10) Patent No.: US 6,195,233 B1
(45) Date of Patent: Feb. 27, 2001

(54) PERPENDICULAR THIN-FILM MAGNETIC HEAD

(75) Inventors: Junichi Akiyama; Hiroaki Yoda, both of Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 09/520,143

(22) Filed: Mar. 7, 2000

Related U.S. Application Data

(62) Division of application No. 09/195,107, filed on Nov. 18, 1998, which is a division of application No. 08/901,667, filed on Jul. 28, 1997, now abandoned, which is a continuation of application No. 08/212,866, filed on Mar. 15, 1994, now abandoned.

(30) Foreign Application Priority Data

Mar. 15, 1993 (JP) .................................... 5-054370
Dec. 28, 1993 (JP) .................................... 5-336848

(51) Int. Cl.$^7$ .................................................. G11B 5/147
(52) U.S. Cl. ............................................................ 360/126
(58) Field of Search ..................................... 360/125, 126

(56) References Cited

U.S. PATENT DOCUMENTS

| | | | |
|---|---|---|---|
| 4,423,450 | * 12/1983 | Hamilton | 360/123 X |
| 4,745,510 | * 5/1988 | Watanabe et al. | 360/135 |
| 4,751,598 | * 6/1988 | Hamilton | 360/110 |
| 4,787,003 | * 11/1988 | Nakamura et al. | 360/126 X |
| 4,897,749 | * 1/1990 | Perlov et al. | 360/126 |
| 4,966,821 | * 10/1990 | Kawashima et al. | 428/694 |
| 5,255,141 | * 10/1993 | Valstyn et al. | 360/113 |
| 5,314,596 | * 5/1994 | Shukovsky et al. | 204/192.2 |

OTHER PUBLICATIONS

Electronics, William Chynoweth, "Small thin–film transducers point to fast, dense storage systems", pp. 122–127, Jul. 25, 1974.

IEEE Transactions on Magnetics, vol. Mag–9, No. 3, Erich P. Valstyn, et al., "Performance of Single–Turn Film Heads", pp. 317–322, Sep. 1973.

\* cited by examiner

Primary Examiner—William R. Korzuch
(74) Attorney, Agent, or Firm—Oblon, Spivak, McClelland, Maier & Neustadt, P.C.

(57) ABSTRACT

Disclosed is a thin-film magnetic head comprising a ring-shaped magnetic core and a coil surrounded by the magnetic core, given that an inner circumferential length of the magnetic core surrounding the coil is Lc, a magnetic gap length is g, a magnetic gap depth is D, an average magnetic flux density (unit: T (tesla)) is Bav and an effective magnetic permeability of the magnetic core is $\mu$, Lc, g and D being determined in such a manner that a magnetomotive force I needed for recording, expressed by a following equation (1), becomes equal to or less than 0.1 A·T (Ampere·Turn):

$$I = \frac{2\pi D B_{av}}{\mu \mathrm{Log}\{[(Lc+g)+2\pi D]/(Lc+g)\}} \quad (1)$$

where Log is a natural logarithm, and variables in the equation (1) are expressed in SI units.

10 Claims, 7 Drawing Sheets

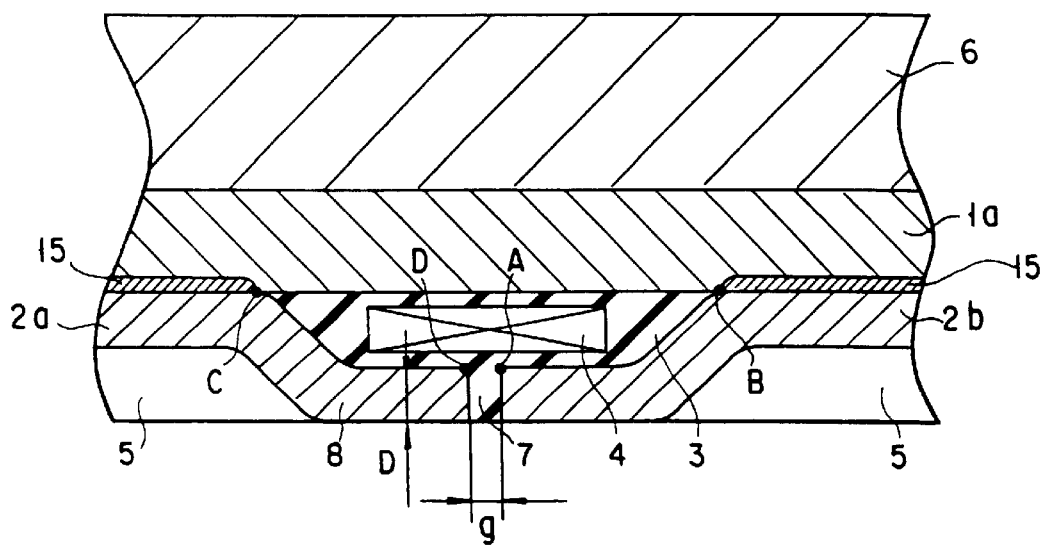
F I G. 7
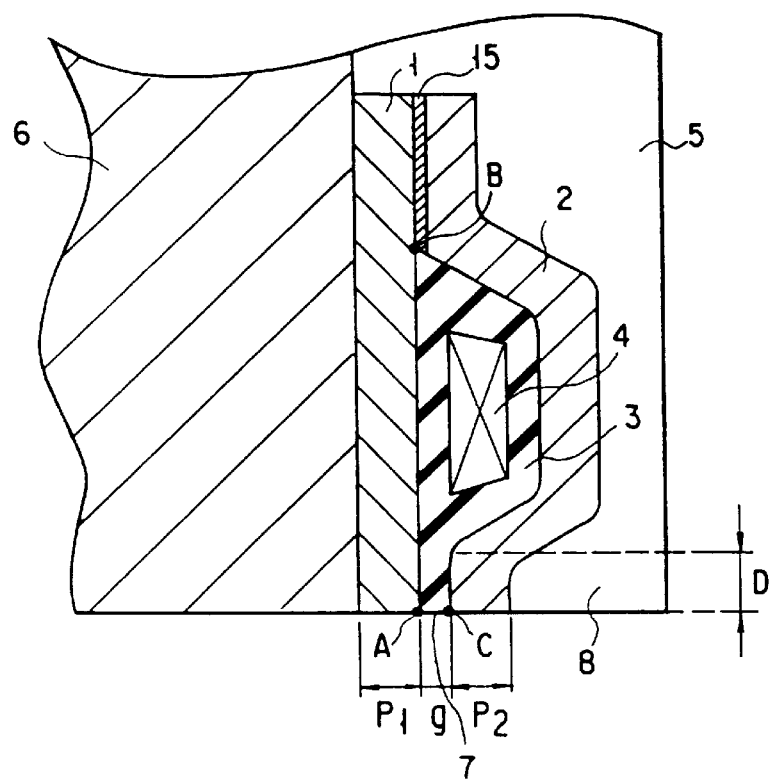
F I G. 8

PERPENDICULAR THIN-FILM MAGNETIC HEAD

This application is a Division of application Ser. No. 09/195,107, filed on Nov. 18, 1998, pending, which is a Division of application Ser. No. 08/901,667, filed Jul. 28, 1997, abandoned, which is a File Wrapper Continuation of U.S. Ser. No. 08/212,866, filed Mar. 15, 1994, abandoned.

BACKGROUND OF THE INVENTION

1. Field of the Invention

The present invention relates to a thin-film magnetic head for use in a magnetic disk apparatus, a VTR, etc., and a magnetic write/read apparatus equipped with this magnetic head, and more particularly, to a very small thin-film magnetic head which has low recording magnetomotive force necessary for magnetizing a magnetic recording medium, has a fewer number of recording coil turns and has a very narrow track width, and a magnetic write/read apparatus equipped with this magnetic head.

2. Description of the Related Art

For an inductive magnetic head which has been conventionally popular, when used both for writing and reading, it is in principle advantageous to increase the number of coil turns because this provides a larger reading output. With such a magnetic head used exclusively for information writing, however, the number of coil turns can be reduced as long as the magnetomotive force required for writing is satisfied. The inductive magnetic head for exclusive use in information writing, therefore, has a simpler structure than the aforementioned inductive magnetic head designed both for writing and reading, thus facilitating the head fabrication process and improving the production yield. The magnetic head for writing only has a further advantage in easier miniaturization of the magnetic core portion and easily ensuring the high efficiency of the head.

It is a magnetic head with a single-turn coil which has the simplest structure and is attractive. It is known that the recording current needed to magnetize a magnetic recording medium using a single-turn magnetic head fabricated by the prior art design technology is around 1 A (Ampere), namely, 0.7 to 0.8 A or 1.5 A. (See E. P. Valsyn and L. F. Shew, "Performance of Single-Turn Film Heads," IEEE Trans. MAG-9, No. 3, September 1973, and W. Chynoweth, "Small Thin-film Transducers Point to Fast, Dense Storage Systems, Electronics, July 25, pp. 122–127, 1974.)

This means that the magnetomotive force of the conventional single-turn coil magnetic head does not differ from that of the conventional inductive magnetic head designed for writing and reading (several dozens of turns), which is about 1 A·T (Ampere·Turn).

Since the conventional single-turn head or few-turns head requires a recording current larger by a factor of several tens than that of the writing/reading head, the burden on the driver circuit to supply the recording current is very heavy. What is more, because of the large current, the heat generated by the coil portion will deteriorate the characteristic and reliability of the head. To cope with never stopping improvement of the density of magnetic recording apparatuses, there will be expected demands for further miniaturization of the magnetic core and further reduction of the number of coil turns. This therefore requires some design scheme for a low-magnetomotive force magnetic head, which can magnetize a magnetic recording medium with a low magnetomotive force, preferably of several dozens of milliamperes·turns (mA·T), similar to the writing current needed by the conventional inductive write/read magnetic head.

Further, since the thickness of the magnetic pole in the plane facing the recording medium for the conventional inductive magnetic head is on the order of several micrometers ($\mu$m), the dimensional tolerance of machining for the pole track width has been considered to be limited to around ±0.5 $\mu$m as long as the state-of-the-art film etching process is used, and it is very difficult to provide a narrow track width of 1 $\mu$m or below. A solution to this shortcoming has been craved so far.

SUMMARY OF THE INVENTION

It is therefore a primary object of the present invention to provide a very small, single-turn or few-turns thin-film magnetic head, which needs considerably lower magnetomotive force for recording than the conventional heads, is excellent in processing precision, and will ensure recording with a very narrow track width of several $\mu$m or narrower, particularly, 1 $\mu$m or narrower.

It is another object of this invention to provide a magnetic write/read apparatus which will exhibit excellent writing and reading characteristics and a high reading S/N ratio.

To achieve the above objects, according to one aspect of this invention, there is provided a thin-film magnetic head comprising a ring-shaped magnetic core and a coil surrounded by the magnetic core, given that an inner circumferential length of the magnetic core surrounding the coil is Lc, a magnetic gap length is g, a magnetic gap depth is D, an average magnetic flux density (unit: T (tesla)) is Bav and an effective magnetic permeability of the magnetic core is $\mu$, Lc, g and D being determined in such a manner that a magnetomotive force I needed for recording, expressed by a following equation (1), becomes 0.001 A·T to 0.1 A·T (Ampere·Turn):

$$I = \frac{2\pi D Bav}{\mu \text{Log}\{[(Lc+g)+2\pi D]/(Lc+g)\}} \quad (1)$$

wherein Log is a natural logarithm, and variables in the equation (1) are expressed in SI units.

According to another aspect of this invention, there is provided a perpendicular thin-film magnetic head comprising a magnetic core having a main magnetic pole and a return path of a high magnetic permeability to be magnetically coupled to the main magnetic pole, and a coil surrounded by the magnetic core, for accomplishing writing and reading when in use with a perpendicular double-layered magnetic recording medium having a highly permeable layer and a perpendicular recording layer laminated on a substrate in a named order, given that an inner circumferential length of the magnetic core surrounding the coil is Lc, a distance from the medium opposing face of the perpendicular thin-film magnetic head to a recording-layer side face of the highly permeable layer of the recording medium is S, an interval between the main magnetic pole and the return path at a position of the medium opposing face is Lb, a film thickness in a vicinity of the medium opposing face of the main magnetic pole is Tm, an average value of the density of a magnetic flux (unit: T (tesla)) generated toward the highly permeable layer from a distal end portion of the main magnetic pole, needed for sufficiently magnetizing the perpendicular recording layer, is Bav and an effective magnetic permeability of the magnetic core is $\mu$, Lc, S, Lb and Tm being determined in such a manner that a magnetomotive force I needed for recording, expressed by a following equation (2), becomes 0.001 A·T to:

$$I = \frac{2\pi TmBav}{\mu \text{Log}\{(L + 2\pi Tm)/L\}} \quad (2)$$

wherein Log is a natural logarithm, L=Lc+2S+Lb, and variables in the equation (2) are expressed in SI and variables in the equation (2) are expressed in SI units.

According to a further aspect of this invention, there is provided a magnetic writing/reading apparatus equipped with a recording magnetic head comprising a ring-shaped magnetic core and a coil surrounded by the magnetic core, and a magnetic recording medium on which recording is done by the recording magnetic head, given that an inner circumferential length of the magnetic core surrounding the coil of the recording magnetic head is Lc, a magnetic gap length is g, a magnetic gap depth is D, an average magnetic flux density (unit: T (tesla)) is Bav and an effective magnetic permeability of the magnetic core is $\mu$, Lc, g and D are determined in such a manner that a magnetomotive force I needed for recording, expressed by a following equation (1), becomes 0.001 A·T to 0.1 A·T (Ampere·Turn), and a magnetic field Hx in a magnetic-head running direction of the magnetic recording medium immediately below a center portion of a magnetic gap of the recording magnetic head being expressed by a following equation (3) and the magnetic field Hx and coercive force Hc of the magnetic recording medium having a relation of Hx>Hc:

$$I = \frac{2\pi DBav}{\mu \text{Log}\{[(Lc + g) + 2\pi D]/(Lc + g)\}} \quad (1)$$

where Log is a natural logarithm, and variables in the equation (1) are expressed in SI units, and $$Hx = \frac{2Bs}{\pi \mu_0} \left[ \tan^{-1} \frac{t_w(D + d + \delta)}{g\sqrt{(t_w/2)^2 + (d + \delta)^2 + (g/2)^2}} - \tan^{-1} \frac{t_w(d + \delta)}{g\sqrt{(t_w/2)^2 + (d + \delta)^2 + (g/2)^2}} \right] \quad (3)$$

where g is a magnetic gap length of the recording magnetic head, D is a magnetic gap depth of the recording magnetic head, $t_w$ is a track width, Bs is a saturation magnetic flux density (unit: T (tesla)) of a magnetic head core necessary to generate a recording magnetic field needed for magnetization of the magnetic recording medium, $\mu_0$ is a magnetic permeability in vacuum, d is spacing between the recording magnetic head and the magnetic recording medium, and $\delta$ is a thickness of a recording layer of the magnetic recording medium.

According to a still further aspect of this invention, there is provided a magnetic write/read apparatus equipped with a recording magnetic head comprising a magnetic core having a main magnetic pole and a return path of a high magnetic permeability to be magnetically coupled to the main magnetic pole, and a coil surrounded by the magnetic core, and a reading magnetic head provided integrally with or separate from the recording magnetic head, for accomplishing writing and reading when in use with a perpendicular double-layered magnetic recording medium having a highly permeable layer and a perpendicular recording layer laminated on a substrate in a named order, given that an inner circumferential length of the magnetic core surrounding the coil of the recording magnetic head is Lc, a distance from the medium opposing face of the recording magnetic head to a recording-layer side face of the highly permeable layer of the recording medium is S, an interval between the main magnetic pole and the return path at a position of the medium opposing face is Lb, a film thickness in a vicinity of the medium opposing face of the main magnetic pole is Tm, an average value of the density of a magnetic flux (unit: T (tesla)) generated toward the highly permeable layer from a distal end portion of the main magnetic pole, needed for sufficiently magnetizing the perpendicular recording layer, is Bav and an effective magnetic permeability of the magnetic core is $\mu$, Lc, S, Lb and Tm being determined in such a manner that a magnetomotive force I needed for recording, expressed by a following equation (2), becomes 0.001 A·T to 0.1 A·T, and a magnetic field Hy in a direction perpendicular to a main surface of the magnetic recording medium immediately below the main magnetic pole of the recording magnetic head being expressed by a following equation (4) and the magnetic field Hy and coercive force Hc of the magnetic recording medium having a relation of Hy>Hc:

$$I = \frac{2\pi TmBav}{\mu \text{Log}\{(L + 2\pi Tm)/L\}} \quad (2)$$

wherein Log is a natural logarithm, L=Lc+2S+Lb, and variables in the equation (2) are expressed in SI units, and $$Hy = \frac{2Bs}{\pi \mu_0} \cdot \tan^{-1} \frac{t_w \cdot t_m}{4(d + \delta)\sqrt{(t_w/2)^2 + (t_m/2)^2 + (d + \delta)^2}} \quad (4)$$

wherein tm is a thickness of the main magnetic pole of the recording magnetic head, $t_w$ is a track width, Bs is a saturation magnetic flux density (unit: T (tesla)) of the main magnetic pole necessary to generate a recording magnetic field needed for magnetizing the magnetic recording medium, $\mu_0$ is a magnetic permeability in vacuum, d is spacing between the recording magnetic head and the magnetic recording medium, and $\delta$ is a thickness of a recording layer of the magnetic recording medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a cross-sectional view showing a ring-shaped horizontal thin-film magnetic head according to a fifth embodiment of this invention;

FIG. 8 is a cross-sectional view showing a ring-shaped thin-film magnetic head according to a sixth embodiment of this invention;

DETAILED DESCRIPTION OF THE REFERRED EMBODIMENTS

Figure 1:
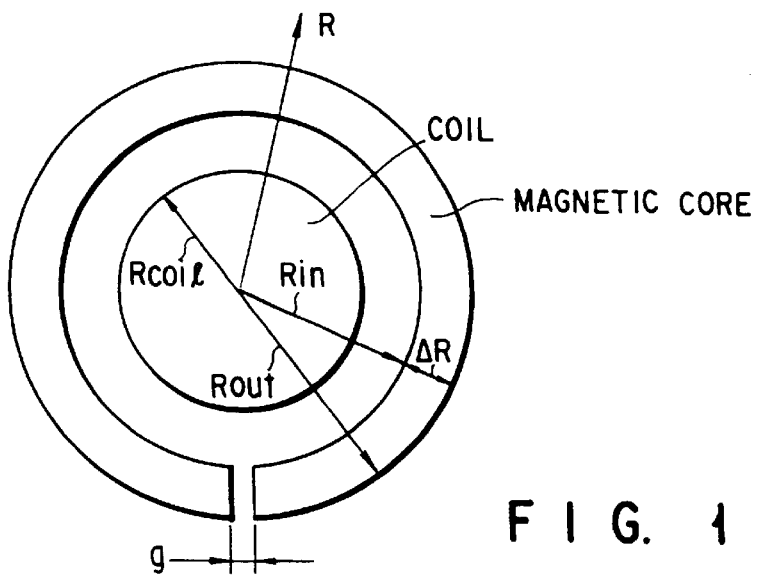
FIG. 1 is a diagram schematically showing a magnetic head for explaining the action of this invention.

The first aspect of this invention provides a thin-film magnetic head comprising a ring-shaped magnetic core and a coil surrounded by the magnetic core.

This thin-film magnetic head is characterized in that, given that an inner circumferential length of the magnetic core surrounding the coil is Lc, a magnetic gap length is g, a magnetic gap depth is D, an average magnetic flux density (unit: T (tesla)) is Bav and an effective magnetic permeability of the magnetic core is $\mu$, Lc, g and D are determined in such a manner that a magnetomotive force I needed for writing, expressed by a following equation (1), becomes equal to or less than 0.1 A·T (Ampere·Turn):

$$I = \frac{2\pi DBav}{\mu \text{Log}\{(L+2\pi D)/L\}} \quad (1)$$

wherein Log is a natural logarithm, L=Lc+g, and variables in the equation (1) are expressed in SI units.

It is preferable that the magnetomotive force I range from 0.001 A·T to 0.07 A·T, more preferably, from 0.01 A·T to 0.07 A·T. Further, it is preferable that D Is in a range from 0.1 to 0.5 $\mu$m.

In this thin-film magnetic head, the magnetic core may comprise a first magnetic layer formed on a head substrate and a second magnetic layer formed on the first magnetic layer. In this case, a thin film or a multi-layered thin-film, which is made of at least one type of magnetic or non-magnetic material selected from a group of a non-magnetic material, a magnetic material having a lower saturation magnetic flux density than that of the magnetic core and an antiferromagnetic material, may be provided at the interface between the first magnetic layer and the second magnetic layer.

The non-magnetic material includes $Al_2O_3$, $SiO_2$ and Cu, the magnetic material having a lower saturation magnetic flux density than that of the magnetic core includes CoZr-based amorphous material and Parmalloy containing Nb or Rh, and the antiferromagnetic material includes FeMn, NiO and PtMn.

This invention can also be adapted for a perpendicular thin-film magnetic head.

The second aspect of this invention provides a perpendicular thin-film magnetic head comprising a magnetic core having a main magnetic pole and a return path of a high magnetic permeability to be magnetically coupled to the main magnetic pole, and a coil surrounded by the magnetic core, for accomplishing writing and reading when in use with a perpendicular double-layered magnetic recording medium having a highly permeable layer and a perpendicular recording layer laminated on a substrate in a named order.

This perpendicular thin-film magnetic head is characterized in that, given that an inner circumferential length of the magnetic core surrounding the coil is Lc, a distance from a medium opposing face of the perpendicular thin-film magnetic head to a recording-layer side face of the highly permeable layer of the recording medium is S, an interval between the main magnetic pole and the return path at a position of the medium opposing face is Lb, a film thickness in a vicinity of the medium opposing face of the main magnetic pole is Tm, an average value of the density of a magnetic flux (unit: T (tesla)) generated toward the highly permeable layer from a distal end portion of the main magnetic pole, needed for sufficiently magnetizing the perpendicular recording layer, is Bav and an effective magnetic permeability of the magnetic core is $\mu$, Lc, S, Lb and Tm being determined in such a manner that a magnetomotive force I needed for recording, expressed by a following equation (2), becomes 0.001 A·T to 0.1 A·T:

$$I = \frac{2\pi TmBav}{\mu \text{Log}\{(L+2\pi Tm)/L\}} \quad (2)$$

where Log is a natural logarithm, L=Lc+2S+Lb, and variables in the equation (2) are expressed in SI units.

It is preferable in this perpendicular thin-film magnetic head too that the magnetomotive force I range from 0.001 A·T to 0.07 A·T, more preferably, from 0.01 A·T to 0.07 A·T. Further, it is preferable that D is in a range from 0.1 to 0.5 $\mu$m.

In this perpendicular thin-film magnetic head, a thin-film or a multi-layered thin-film, made of at least one type of magnetic or non-magnetic material selected from the group consisting of a non-magnetic material, a magnetic material having a lower saturation magnetic flux density than those of the main magnetic pole and the return path, and an antiferromagnetic material, may be provided at the interface between the main magnetic pole and the return path.

According to the thin-film magnetic heads of this invention with the above-described structures, it is possible to magnetize a magnetic recording medium with magnetomotive force significantly lower than that of the conventional ring-shaped inductive magnetic head, thus facilitating the reduction of the number of turns of the coil and the miniaturization of the magnetic core with high reliability. Further, the fabrication of the magnetic heads become easier and the production yield is improved. It is also possible to accomplish high working precision to form a magnetic core with a narrow track width of several $\mu$m or below.

The third aspect of this invention provides a magnetic write/read apparatus equipped with a writing magnetic head comprising a ring-shaped magnetic core and a coil surrounded by the magnetic core, and a magnetic recording medium on which recording is done by the recording magnetic head.

This magnetic write/read apparatus is characterized in that, given that an inner circumferential length of the magnetic core surrounding the coil of the recording magnetic head is Lc, a magnetic gap length is g, a magnetic gap depth is D, an average magnetic flux density (unit: T (tesla)) is Bav and an effective magnetic permeability of the magnetic core is μ, Lc, g and D are determined in such a manner that a magnetomotive force I needed for recording, expressed by the above equation (1), becomes 0.001 A·T to 0.1 A·T (Ampere·Turn), and a magnetic field Hx in a magnetic-head running direction of the magnetic recording medium immediately below a center portion of the recording magnetic head being expressed by a following equation (3) and the magnetic field Hx and coercive force Hc of the magnetic recording medium having a relation of Hx>Hc:

$$Hx = \frac{2Bs}{\pi\mu_0} \left| \tan^{-1} \frac{t_w(D+d+\delta)}{g\sqrt{(t_w/2)^2 + (d+\delta)^2 + (g/2)^2}} - \tan^{-1} \frac{t_w(d+\delta)}{g\sqrt{(t_w/2)^2 + (d+\delta)^2 + (g/2)^2}} \right| \quad (3)$$

wherein g is a magnetic gap length of the recording magnetic head, D is a magnetic gap depth of the recording magnetic head, $t_w$ is a track width, Bs is a saturation magnetic flux density (unit: T (tesla)) of a magnetic head core necessary to generate a recording magnetic field needed for magnetization of the magnetic recording medium, $\mu_0$ is a magnetic permeability in vacuum, d is spacing between the recording magnetic head and the magnetic recording medium, and δ is a thickness of a recording layer of the magnetic recording medium, and wherein variables in the equation (3) are expressed in SI units.

It is preferable that the magnetomotive force I range from 0.001 A·T to 0.07 A·T, more preferably, from 0.01 A·T to 0.07 A·T. It is preferable that D be in a range from 0.1 to 0.5 μm.

In this magnetic write/read apparatus, the magnetic core may comprise a first magnetic layer formed on a head substrate and a second magnetic layer formed on the first magnetic layer. In this case, a thin film or a multi-layer thin-film, made of at least one type of magnetic or non-magnetic material selected from a group of a non-magnetic material, a magnetic material having lower saturation magnetic flux density than that of the magnetic core and an antiferromagnetic material, may be provided at the interface between the first magnetic layer and the second magnetic layer.

The above-mentioned material can be used as the material for the thin film.

The fourth aspect of this invention provides a magnetic write/read apparatus equipped with a recording magnetic head comprising a magnetic core having a main magnetic pole and a return path of a high magnetic permeability to be magnetically coupled to the main magnetic pole, and a coil surrounded by the magnetic core, and a reading magnetic head provided integrally with or separate from the recording magnetic head, for accomplishing writing and reading when in use with a perpendicular double-layered magnetic recording medium having a highly permeable layer and a perpendicular recording layer laminated on a substrate in a named order.

This magnetic write/read apparatus is characterized in that, given that an inner circumferential length of the magnetic core surrounding the coil of the writing magnetic head is Lc, a distance from a medium opposing face of the recording magnetic head to a recording-layer side face of the highly permeable layer of the recording medium is S, an interval between the main magnetic pole and the return path at a position of the medium opposing face is Lb, a film thickness in a vicinity of the medium opposing face of the main magnetic pole is Tm, an average value of the density of a magnetic flux (unit: T (tesla)) generated toward the highly permeable layer from a distal end portion of the main magnetic pole, needed for sufficiently magnetizing the perpendicular recording layer, is Bav and an effective magnetic permeability of the magnetic core is μ, Lc, S, Lb and Tm being determined in such a manner that a magnetomotive force I needed for writing, expressed by the above equation (2), becomes 0.001 A·T 0.1 A·T, and a magnetic field intensity Hy in a direction perpendicular to a surface of the magnetic recording medium immediately below the main magnetic pole of the writing magnetic head being expressed by a following equation (4) and the magnetic field Hy and coercive force Hc of the magnetic recording medium having a relation of Hy>Hc:

$$Hx = \frac{2Bs}{\pi\mu_0} \cdot \tan^{-1} \frac{t_w \cdot t_m}{4(d+\delta)\sqrt{(t_w/2)^2 + (t_m/2)^2 + (d+\delta)^2}} \quad (4)$$

wherein tm is a thickness of the main magnetic pole of the recording magnetic head, $t_w$ is a track width, Bs is a saturation magnetic flux density (unit: T (tesla)) of the main magnetic pole necessary to generate a recording magnetic field needed for magnetizing the magnetic recording medium, $\mu_0$ is a magnetic permeability in vacuum, d is spacing between the recording magnetic head and the magnetic recording medium, and δ is a thickness of a recording layer of the magnetic recording medium, and wherein variables in the equation (4) are expressed in SI units.

In this perpendicular thin-film magnetic head, a thin film or a multi-layered thin-film, made of at least one type of magnetic or non-magnetic material selected from a group of a non-magnetic material, a magnetic material having a lower saturation magnetic flux density than those of the main magnetic pole and the return path, and an antiferromagnetic material, may be provided at the interface between the main magnetic pole and the return path.

The function of this invention will now be explained on the basis of the design scheme, developed by the present inventors, for a very small thin-film magnetic head with low magnetomotive force and high working precision.

Let us consider a coil having a circular cross section a cylindrical magnetic core that concentrically surrounds this coil, as shown in FIG. 1. A very narrow magnetic gap is formed in this magnetic core. Given that the inner radius of the magnetic core is Rin, the outer radius of the magnetic core is Rout (from which the thickness of the magnetic core is ΔR=Rout−Rin), the magnetic gap length is g, the track width of the magnetic core is W, the total magnitude of the recording current that flows across the coil is I (equivalent to magnetomotive force), and the effective magnetic permeability of the magnetic core is μ, the density of a magnetic flux Φ induced on the magnetic core by the current I is expressed by an equation (5) below in approximation.

$$\Phi = W \int_{Rin}^{Rout} \frac{\mu I}{2\pi R} dR \quad (5)$$
$$= \frac{\mu W I}{2\pi} \text{Log}(Rout/Rin)$$

Thus, an average value Bav of the density of a magnetic flux, induced on the magnetic core by the current I, in the thickness wise direction (radius direction in FIG. 1) of the magnetic core is expressed by the following equation (6); the average value Bav is nearly the same as the average magnetic flux density in the magnetic gap. In the equation (6), "Log" is a natural logarithm.

$$Bav = \frac{\mu I}{2\pi(Rout - Rin)} \text{Log}(Rout/Rin) \quad (6)$$

Rewriting the equation (6) yields:

$$I = \frac{2\pi(Rout - Rin)Bav}{\mu \text{Log}(Rout/Rin)} \quad (7)$$

Let us consider a simple case where Rout and Rin are made smaller with Rout/Rin being a constant. It is understood from the equation (7) that with $\mu$ being a constant, the magnetomotive force I necessary to obtain a constant Bav decreases in proportion to (Rout–Rin). This means that making the magnetic core of the magnetic head properly compact will significantly reduce the recording magnetomotive force.

It is to be emphasized that since the above-described design scheme has not been employed in fabricating the conventional inductive magnetic heads, regardless of bulk heads or thin-film heads, magnetomotive force of above several hundred mA·T (about 1 A·T on an average) is needed conventionally.

Figure 2:
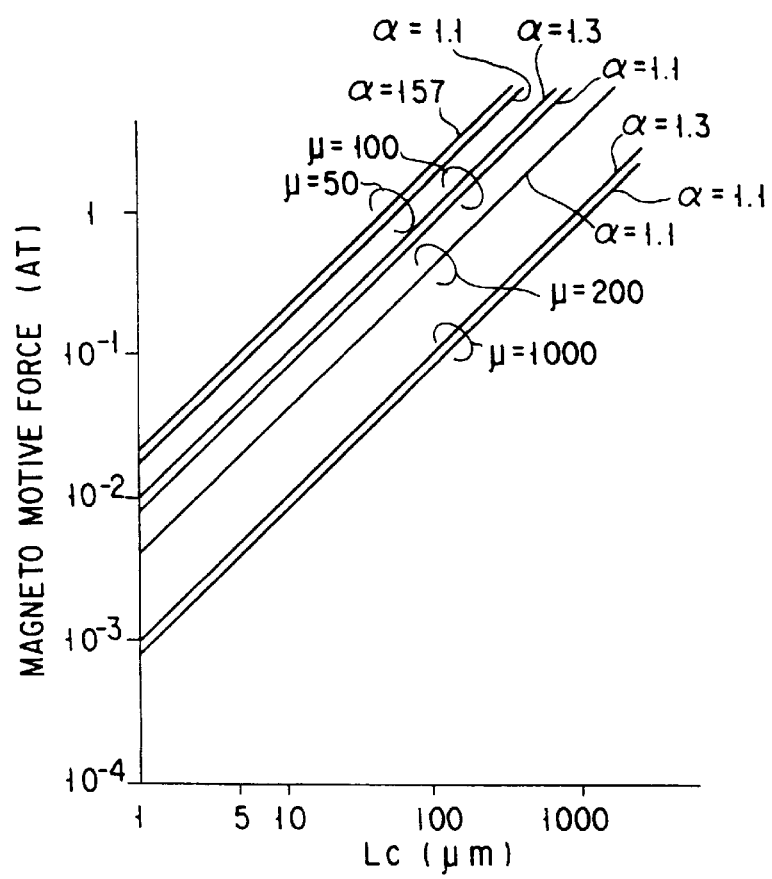
FIG. 2 is a graph showing the relation between magnetomotive force and the inner circumferential length of a magnetic core for explaining the action of this invention.

FIG. 2 shows the result of computing the relation between the magnetomotive force I necessary for obtaining Bav=1T and the inner circumferential length Lc (=2πRin: the magnetic gap length g disregarded) of the magnetic core as an example, with α=Rout/Rin and $\mu$ taken as parameters, using the equation (7). The value of (Rout–Rin) is obtained by (α–1)Lc/(2π).

Referring to FIG. 2, for α=1.1 for $\mu$=200 (value as the specific magnetic permeability), if Lc is reduced to 5 $\mu$m from 1000 $\mu$m, the magnetomotive force I is decreased by a factor of 200 to about 20 mA·T from about 4 A·T. This value, about 20 mA·T, is nearly equal to or smaller than the recording current value needed to magnetize the magnetic recording medium using an ordinary write/read inductive magnetic head with many turns coil. It is to be noted that the values of (Rout–Rin) respectively corresponding to Lc=1000 $\mu$m and Lc=5 $\mu$m are 15.9 $\mu$m and 0.08 $\mu$m.

Even if the value of $\mu$ (specific magnetic permeability) obtained for Lc=5 $\mu$m is just "50" for some reason, it is apparent that recording can be done with low magnetomotive force that is a quarter of that in the case of the mentioned Lc=1000 $\mu$m, i.e., about 80 mA·T. Apparently, the use of the design scheme expressed in the equation (5) for a small thin-film magnetic head will provide a thin-film magnetic head with considerably low magnetomotive force.

The working precision on the pole track width on the medium opposing face is very important in fabricating a magnetic head. Generally speaking, the dimensional tolerance of machining for the pole track width should be set to 1/10 of a predetermined track width or less. According to the state-of-the-art thin-film head fabricating process, the dimensional tolerance for the track width of about 5 $\mu$m and the magnetic core thickness of 3 to 4 $\mu$m is about ±0.5 $\mu$m, which almost satisfies the above condition. If the existing semiconductor process technology is adapted properly, the dimensional tolerance for the track width can be reduced approximately by a factor of 10 by reducing the magnetic core thickness by a factor of 10.

To achieve a very narrow track width of 1 $\mu$m or narrower, therefore, the dimensional tolerance for the pole track width should be set as large as ±0.1 $\mu$m or smaller, or the magnetic core thickness at least on the medium opposing face should be set to or below 1 $\mu$m. In the case of fabricating a separate write/read type thin-film magnetic head having a lamination structure of a recording head and a reading head like a magneto resistive head, the accuracy of positioning the recording head and the reading head as well as the dimensional tolerance for the pole track width are very concerning matters. In this type of recording head, therefore, sufficient write/read characteristics and reading S/N ratio should be attained even in consideration of the dimensional tolerance for the pole track width, the positioning dimensional tolerance, an off-track amount, and so forth in order to achieve a track width of 1 $\mu$m or narrower.

It is generally necessary to set the effective sum of those dimensional tolerances or errors to 1/10 of the recording track width. This requires that the dimensional tolerance for the pole track width be suppressed down to or below 1/10 of the recording track width. More specifically, for a track width of 1 $\mu$m or narrower, it is preferable that the dimensional tolerance for the pole track width should be set to ±0.05 $\mu$m or smaller, or the magnetic core thickness on the medium opposing face should be set to or below 0.5 $\mu$m. In the aforementioned example (Lc=5 $\mu$m), since the magnetic core thickness is 0.08 $\mu$, the dimensional tolerance for the track width is 1/10 thereof, thus ensuring a very narrow track of 1 $\mu$m or narrower. It is now apparent that the use of the new design scheme expressed by the equation (7) will provide a thin-film magnetic head with a very narrow track width of 1 $\mu$m or narrower.

There will now be described a write/read apparatus for accomplishing writing and reading an information using the thin film magnetic head described above.

Figure 12:
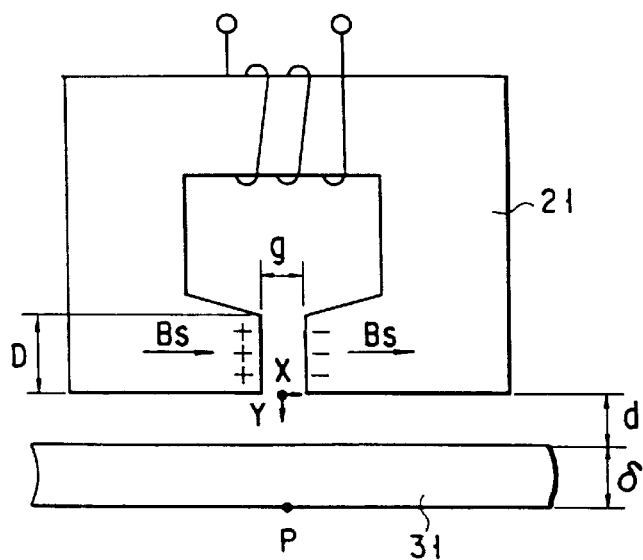
FIG. 12 is a view showing a magnetic write/read apparatus according to a ninth embodiment of this invention.
Figure 13:
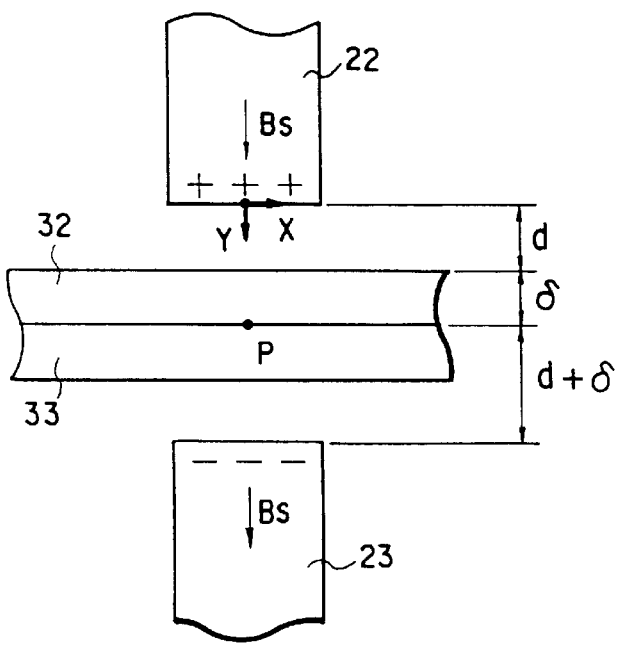
FIG. 13 is a view showing a magnetic/read apparatus according to a tenth embodiment of this invention.

FIG. 12 shows a write/read apparatus equipped with a ring-shaped thin film magnetic head 21, and FIG. 13 shows a write/read apparatus equipped with a perpendicular thin film magnetic head 22. In FIGS. 12 and 13, a dimension of every part of the apparatus is shown. The dimensions are parameters for reading the information written in a recording layer 32 of a magnetic recording medium 31 running under the thin film magnetic head 21, 22.

In the magnetic write/read apparatus equipped with the ring-shaped head 21 and shown in FIG. 12, the intensity Hx of the magnetic field in the running direction of the magnetic head immediately below the central portion of a magnetic gap of the writing magnetic head is induced as follows: Where Bs is a saturation magnetic flux density of the magnetic core of the magnetic head, the maximum value Hx of the writing magnetic field intensity in the running direction of the recording truck at point P on the bottom surface of the magnetic recording layer immediately below the magnetic gap, is expressed by an equation (8) below.

$$Hx = \quad (8)$$

-continued $$\frac{2 \cdot Bs}{\pi \mu_0} \left\{ \tan^{-1} tw \times \frac{(D+d+\delta)}{g \times \sqrt{\frac{tw^2}{2} + (d+\delta)^2 + \frac{g^2}{2}}} - \tan^{-1} tw \times \frac{(d+\delta)}{g \times \sqrt{\frac{tw^2}{2} + (d+\delta)^2 + \frac{g^2}{2}}} \right\}$$

tw : track width of magnetic head
g : magnetic gap
d : spacing between head and medium
δ : thickness of magnetic recording layer In the magnetic write/read apparatus equipped with the perpendicular head 22 and shown in FIG. 13, the intensity Hy of the magnetic field in a direction perpendicular to a surface of the magnetic recording medium 31 immediately below the central portion of the recording magnetic pole 22 is induced as follows:
Where Bs is a saturation magnetic flux density of the main magnetic pole, and considering an effect due to the mirror image 23 of the main magnetic pole, cause by the highly permeable layer 33, the maximum value Hy of the writing magnetic field intensity in a direction perpendicular to a surface of the magnetic recording medium at point P (x=0, y=d+δ, z=0) on the bottom surface of the perpendicular recording layer 32 immediately below the main magnetic pole is expressed by an equation (9) below.

$$Hy = \frac{2 \cdot Bs}{\pi \mu_0} \times \tan^{-1} \frac{tw \times tm}{4(d+\delta) \times \sqrt{\frac{tw^2}{2} + \frac{tm^2}{2} + (d+\delta)^2}} \quad (9)$$

tw : track width of main magnetic pole
tm : thickness of main magnetic pole
d : spacing between main magnetic pole and recording layer
δ : thickness of perpendicular recording layer Various embodiments of this invention will now be described referring to the accompanying drawings.

Embodiment 1

Figure 3:
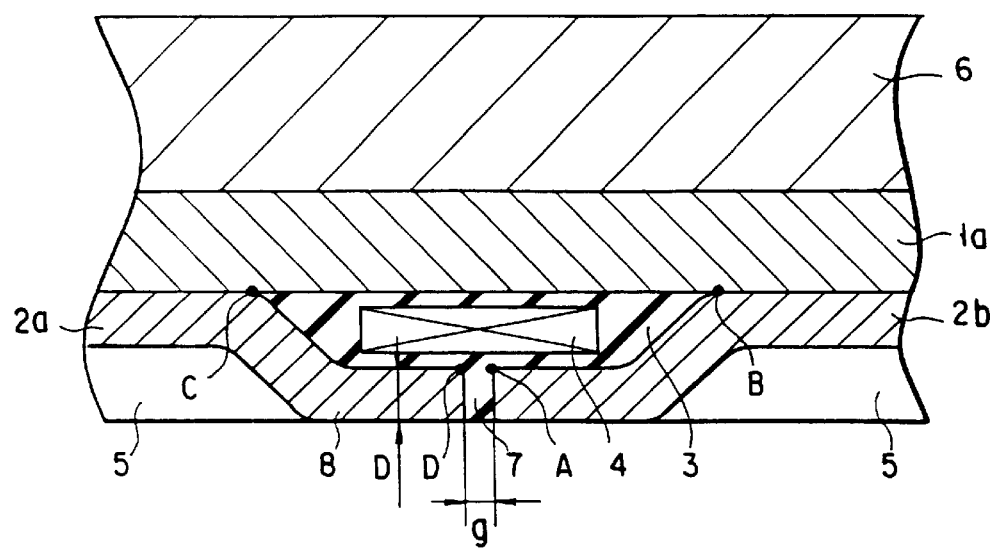
FIG. 3 is a cross-sectional view showing a ring-shaped horizontal thin-film magnetic head according to a first embodiment of this invention.

FIG. 3 is a cross section showing a thin-film magnetic head according to the first embodiment of this invention. This thin-film magnetic head is a ring-shaped horizontal (planar) type thin-film magnetic head, which comprises a magnetic layer 1a, an insulating layer 3, a coil 4, a magnetic layer 2a, a magnetic layer 2b and a head protective layer 5 laminated in order on a head substrate 6, with a magnetic gap 7 sandwiched between the magnetic layers 2a and 2b.

Let us put that a magnetic gap depth is D, a magnetic gap length is g, the inner circumferential length (length of the line A-B-C-D) of a magnetic core, which consists of the magnetic layers 1a, 2a and 2b and surrounds the coil 4 is Lc, an average magnetic flux density (unit: T (tesla)) necessary to generate a predetermined recording magnetic field needed to magnetize a magnetic recording medium is Bav, and the effective magnetic permeability of the ring-shaped magnetic core is μ, as shown in FIG. 3.

As described above, the thin-film magnetic head shown in FIG. 3 are not constituted of a coil having a circular cross section and a cylindrical magnetic core concentrically surrounding this coil. By considering the magnetic core of this thin-film magnetic head as a cylindrical magnetic core, however, the recording magnetomotive force I can be calculated approximately. That is, if the circumferential length Lc and the magnetic gap depth D are considered as Lc=2π Rin and D=Rout−Rin where Rout and Rin are variables in the equation (7), the magnetomotive force I can be expressed as follows:

$$I = \frac{2\pi DBav}{\mu Log\{[(Lc+g)+2\pi D]/(Lc+g)\}}$$

where Log is a natural logarithm and variables in this equation are expressed in SI units.

By determining Lc, g and D in such a manner that the recording magnetomotive force I expressed by this equation becomes 0.001 A·T to 0.1 A·T, it is possible to magnetize a magnetic recording medium with magnetomotive force considerably lower than that of the conventional ring-shaped inductive magnetic head. It is therefore possible to easily accomplish the reduction in number of the coil turns (including a single turn) and miniaturize the magnetic core with high reliability. This design also facilitates the head fabrication and improves the production yield. It is also possible to form a magnetic core with a narrow track width of several μm or below and accomplish high working precision.

For example, with Lc=5 μm, D=0.5 μm, μ (as the specific magnetic permeability)=200 and Bav=1 T, the value of the magnetomotive force I needed to magnetize a magnetic recording medium will be 26 mA·T, which is very low. Therefore, this level of magnetomotive force can be well achieved by a single coil turn, which provides a recording current of 26 mA.

This means that the conventional recording driver circuit can be used, and because of the current being equal to or smaller than that of the conventional head, there hardly is a need to concern the deterioration of the reliability originating from the heat generated by the coil. Further, the single-turn design will significantly reduce the inductance of the coil (which is proportional to a square of the number of coil turns), thus ensuring significant widening of the recording frequency band.

Since the thicknesses of the magnetic layers 2a and 2b constituting the magnetic core which is located on the side of the medium opposing face 8 are D (=0.5 μm), the existing semiconductor process technology can be used to design the track width with the allowance of about ±0.05 μm as has already been discussed. This facilitates the fabrication of a thin-film magnetic head that ensures a very narrow track of 1 μm or below. Furthermore, due to the simple head structure, the is production yield is very high.

As long as Lc, D and g are determined using the above-given equation, the other factors, such as the size and shape of the magnetic core, may be changed freely. For instance, the thickness of the magnetic layer 1a and those of the magnetic layers 2a and 2b at a given distance away from the magnetic gap portion may be set larger than the magnetic gap depth D. This improves the effective magnetic permeability μ of the magnetic core and can thus ensure recording with lower magnetomotive force.

Embodiment 2

Figure 4:
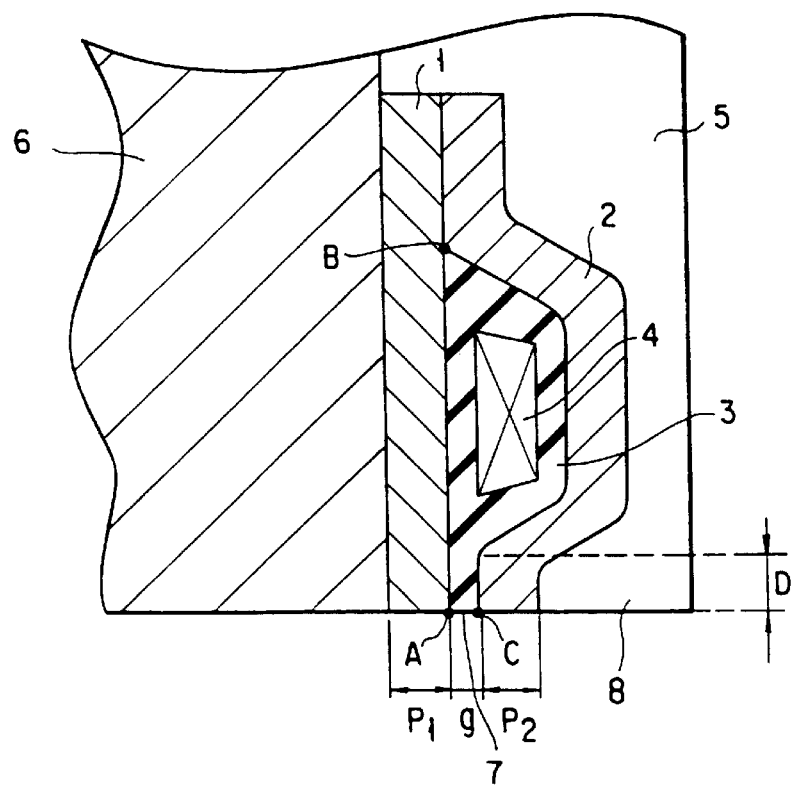
FIG. 4 is a cross-sectional view showing a ring-shaped thin-film magnetic head according to a second embodiment of this invention.

FIG. 4 is a cross section showing a thin-film magnetic head according to the second embodiment of this invention. This thin-film magnetic head is a ring-shaped thin-film magnetic head, which comprises a lower magnetic pole 1, an insulating layer 3, a coil 4, an upper magnetic pole 2 and a head protective layer 5 laminated in order on a head substrate 6, with a magnetic gap 7 sandwiched between the lower magnetic pole 1 and the upper magnetic pole 2.

Given that a magnetic gap length is g, a magnetic gap depth is D, the thickness of the lower magnetic pole 1 on the medium opposing face 8 is P1, the thickness of the upper magnetic pole 2 on the medium opposing face 8 is P2, the inner circumferential length (length of the line A-B-C) of the magnetic core, which consists of the lower magnetic pole 1 and the upper magnetic pole 2 and surrounds the coil 4 is Lc, an average magnetic flux density (unit: T (tesla)) necessary to generate a predetermined recording magnetic field needed to magnetize a magnetic recording medium is Bav, and the effective magnetic permeability of the ring-shaped magnetic core is μ, as shown in FIG. 4, the same advantages as those of the first embodiment can be obtained by the same action of the first embodiment if Lc, g, D, P1 and P2 are determined in such a manner that the magnetomotive force I, expressed by the following equation based on the above-given equation (7) as in the first embodiment, becomes 0.001 A·T to 0.1 A·T preferably 0.07 A·T or less.

$$I = \frac{2\pi D Bav}{\mu \text{Log}\{[(Lc+g)+2\pi D]/(Lc+g)\}}$$

and $$P1 \simeq P2 \simeq D$$

where Log is a natural logarithm, and variables in this equation are expressed in SI units.

As long as the above equation is satisfied in this example too, the thicknesses of the lower magnetic pole 1 and the upper magnetic pole 2 at a given distance away from the medium opposing face may be set larger than the magnetic gap depth D. This increases the effective magnetic permeability μ of the magnetic core more than the structure having both the lower magnetic pole 1 and the upper magnetic pole 2 designed to have the same thickness D (P1≃P2), thus ensuring further reduction of the magnetomotive force.

With P1≃P2≃D≦0.5 μm, it is easy to form a magnetic core having a track width of 1 μm or narrower.

Embodiment 3

Figure 5:
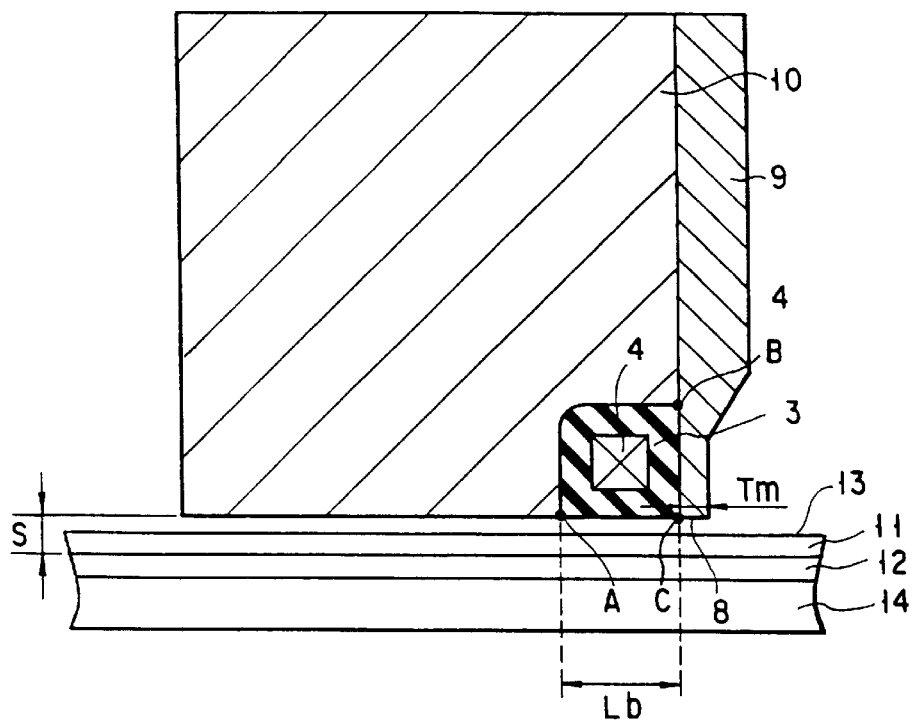
FIG. 5 is a cross-sectional view showing a perpendicular thin-film magnetic head according to a third embodiment of this invention.

FIG. 5 is a cross section showing a perpendicular thin-film magnetic head according to the third embodiment of this invention. This perpendicular thin-film magnetic head performs recording and reproduction when in use with a perpendicular double-layered magnetic recording medium 13, which has a highly permeable layer 12 and a perpendicular recording layer 11 laminated in this order on a medium substrate 14.

This perpendicular thin-film magnetic head comprises a magnetic core having a main magnetic pole 9 and a highly permeable return path 10, which is magnetically coupled to this main magnetic pole 9, and a coil 4 which is surrounded by the magnetic core through an insulating layer 3.

Given that the inner circumferential length (length of the line A-B-C-D) of the magnetic core surrounding the coil 4 is Lc, the distance from the medium opposing face 8 of the perpendicular thin-film magnetic head to the recording-layer side face of the highly permeable layer 12 of the perpendicular double-layered medium 13 is S, the interval between the main magnetic pole 9 and the return path 10 at the position of the medium opposing face 8 is Lb, the film thickness in the vicinity of the medium opposing face 8 of the main magnetic pole 9 is Tm, an average value of the density of a magnetic flux (unit: T (tesla)) generated toward the highly permeable layer 12 from the distal end portion of the main magnetic pole 9, needed for sufficiently magnetizing the perpendicular recording layer 11, is Bav and the effective magnetic permeability of the magnetic core is μ (μ is a value when the highly permeable layer 12 is considered to be included in the magnetic core), with the highly permeable layer 12 considered as a part of the magnetic core, the writing magnetomotive force I can be approximately expressed by the following equation based on the equation (7) as per the first and second embodiments.

By determining Lc, S, Lb and Tm (equivalent to in the first embodiment) in such a manner that the magnetomotive force I becomes 0.001 A·T to 0.1 A·T, preferably 0.07 A·T or less, the same advantages as those of the first embodiment can be obtained by the same action of the first embodiment.

$$I = \frac{2\pi T m Bav}{\mu \text{Log}\{(L+2\pi Tm)/L\}}$$

where L=Lc+2S+Lb and L means the inner circumferential length of the magnetic core surrounding the coil 4 when the highly permeable layer 12 is considered as a part of the magnetic core. The variables in this equation are expressed in SI units.

As long as the above equation is satisfied in this example too, the thickness of the main magnetic pole 9 at a given distance away from the return path 10 and the medium opposing face 8 may be set larger than Tm. This increases the effective magnetic permeability μ of the whole magnetic core more than the structure which has the main magnetic pole 9 and the return path 10 designed to have the same thickness Tm, thus ensuring further reduction of the magnetomotive force.

Embodiment 4

Figure 6:
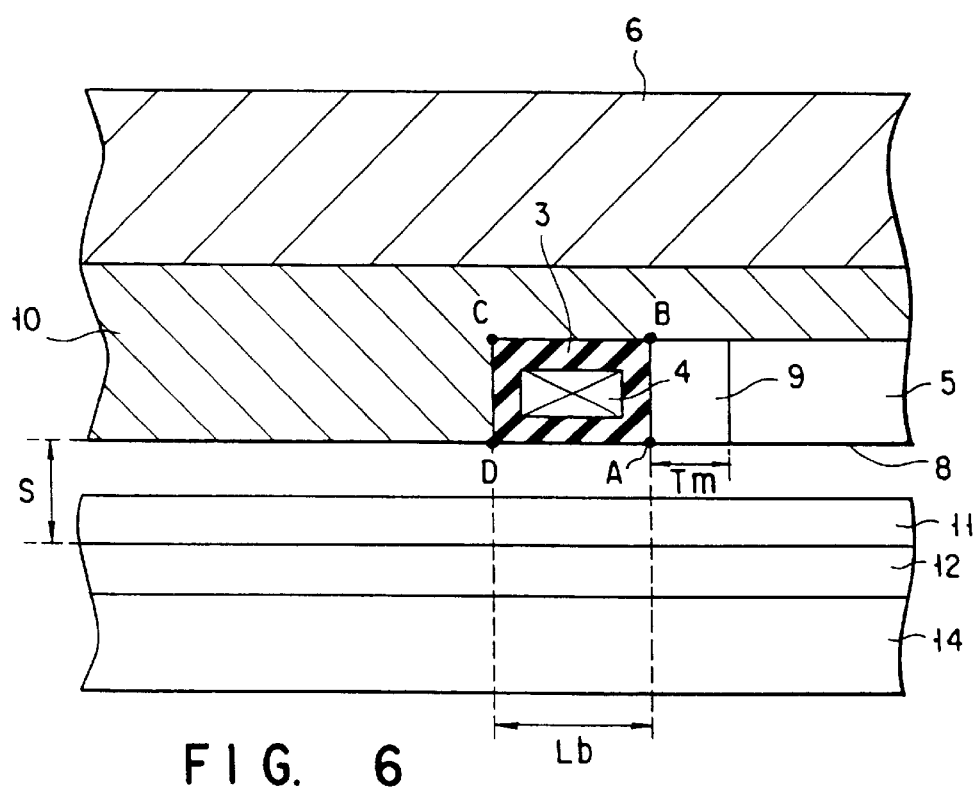
FIG. 6 is a cross-sectional view showing a perpendicular thin-film magnetic head according to a fourth embodiment of this invention.

FIG. 6 is a cross section showing a perpendicular thin-film magnetic head of a horizontal type according to the fourth embodiment of this invention. This thin-film magnetic head comprises a highly permeable return path 10, an insulating layer 3, a coil 4, a main magnetic pole 9, and a protective layer 5 laminated in order on a head substrate 6. Given that the inner circumferential length (length of the line A-B-C-D) of the magnetic core, which consists of the main magnetic pole surrounding the coil 4 and the return path 10, is Lc, the distance from the medium opposing face 8 of the thin-film magnetic head to the recording-layer side face of the highly permeable layer 12 of the perpendicular double-layered medium 13 is S, the interval between the main magnetic pole 9 and the return path 10 at the position of the medium opposing face 8 is Lb, the film thickness in the vicinity of the medium opposing face 8 of the main magnetic pole 9 is Tm, an average value of the density of a magnetic flux (unit: T (tesla)) generated toward the highly permeable layer 12 from the distal end portion of the main magnetic pole 9, needed for sufficiently magnetizing the perpendicular recording layer 11, is Bav and the effective magnetic permeability of the magnetic core is $\mu$ (supposing that the highly permeable layer 12 is included in the magnetic core), the recording magnetomotive force I can be approximately expressed in the same form as in the third embodiment.

By determining Lc, S, Lb and Tm in such a manner that the magnetomotive force I becomes 0.001 A·T to 0.1 A·T, preferably 0.07 A·T or less, the same advantages as those of the first to third embodiments can be obtained by the same action of those embodiments. Further, the perpendicular thin-film magnetic head according to this embodiment has an advantage over the perpendicular thin-film magnetic head of the third embodiment in the head fabrication process such that it will ensure further miniaturization of the magnetic core and lower magnetomotive force.

Embodiment 5

FIG. 7 is a cross section showing a thin-film magnetic head according to the fifth embodiment of this invention. This thin-film magnetic head has the same structure as the thin-film magnetic head of the first embodiment shown in FIG. 3 except that this thin-film magnetic head has a thin film 15 provided at the interface between the magnetic layer 1a and the magnetic layer 2a and the interface between the magnetic layer 1a and the magnetic layer 2b. The thin film 15 is made of at least one type of magnetic or non-magnetic material selected from a group of a non-magnetic material, a magnetic material having a lower saturation magnetic flux density than those of the magnetic layers 1a and 2a, and an antiferromagnetic material.

The thin film 15 is very thin, on the order of several tens of angstroms. The material for the thin film 15 may be a Permalloy alloy, Co-based amorphous material, Fe-based soft magnetic material or Co-based magnetic material.

This thin-film magnetic head has the following advantages besides the same advantages as the thin-film magnetic head of the first embodiment shown in FIG. 3. The provision of the thin film 15 can weaken or cut off the exchange coupling at the interface between the magnetic layers 1a and 2a and the magnetic layers 1a and 2b. Further, the magnetic resistance of the thin film 15 itself is as low as value as can be negligible as compared with the magnetic resistance of the whole ring-shaped magnetic core. Even if the size of the ring-shaped core is reduced in accordance with the reduction in magnetomotive force, therefore, the spatial deformation of the signal magnetization distribution in the magnetic core, caused by the attraction of the signal magnetic flux from the magnetic recording medium by the magnetic core can be reduced, thus preventing the averaged magnetic permeability of the magnetic core from decreasing. This means that lower magnetomotive force can easily be accomplished without decreasing the efficiency of the magnetic core when the magnetic core is miniaturized. Particularly, when an antiferromagnetic material is used for the thin film 15, in addition to those advantages, single domain formation in the whole magnetic core is possible so that various magnetic noises generated at the time of recording can be reduced, thus ensuring high-quality recording.

Embodiment 6

FIG. 8 is a cross section showing a thin-film magnetic head according to the sixth embodiment of this invention. This thin-film magnetic head has the same structure as the thin-film magnetic head of the second embodiment shown in FIG. 3 except that this thin-film magnetic head has a thin film 15 provided at the interface 16 between the lower magnetic pole 1 and the upper magnetic pole 2. The thin film 15 is made of at least one type of magnetic or non-magnetic material selected from a group of a non-magnetic material, a magnetic material having a lower saturation magnetic flux density than those of the lower magnetic pole 1 and the upper magnetic pole 2, and an antiferromagnetic material. The thickness of and the material for the thin film 15 are the same as those of the fifth embodiment.

This thin-film magnetic head has the same advantages as the thin-film magnetic head of the second embodiment shown in FIG. 4, as well as the same action and advantages as the thin-film magnetic head of the fifth embodiment due to the provision of the thin film 15.

Embodiment 7

Figure 9:
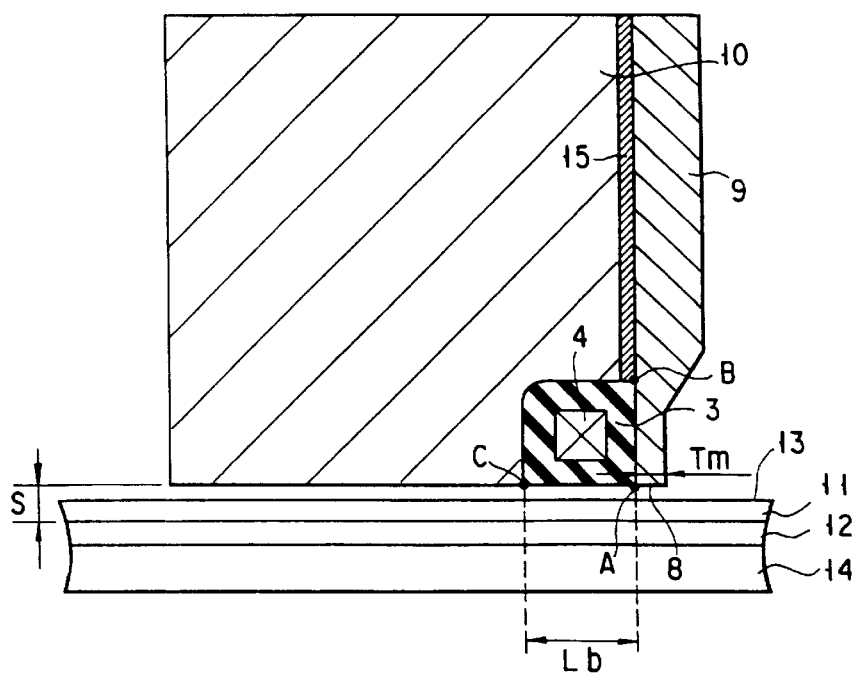
FIG. 9 is a cross-sectional view showing a perpendicular thin-film magnetic head according to a seventh embodiment of this invention.

FIG. 9 is a cross section showing a perpendicular thin-film magnetic head according to the seventh embodiment of this invention. This perpendicular thin-film magnetic head has the same structure as the thin-film magnetic head of the third embodiment shown in FIG. 5 except that this thin-film magnetic head has a thin film 15 provided at the interface between the main magnetic pole 9 and the return path 10. The thin film 15 is made of at least one type of magnetic or non-magnetic material selected from a group of a non-magnetic material, a magnetic material having a lower saturation magnetic flux density than those of the main magnetic pole 9 and the return path 10, and an antiferromagnetic material. The thickness of and the material for the thin film 15 are the same as those of the fifth embodiment.

This thin-film magnetic head has the same advantages as the thin-film magnetic head of the third embodiment shown in FIG. 5, as well as the same action and advantages as the thin-film magnetic head of the fifth embodiment due to the provision of the thin film 15.

Embodiment 8

Figure 10:
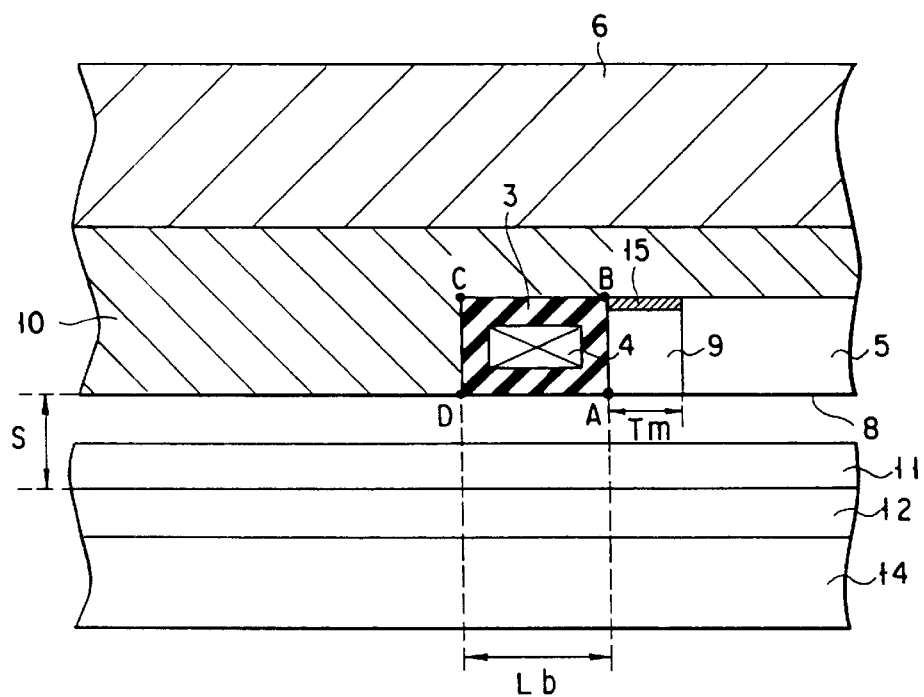
FIG. 10 is a cross-sectional view showing a perpendicular thin-film magnetic head according to an eighth embodiment of this invention.

FIG. 10 is a cross section showing a horizontal type perpendicular thin-film magnetic head according to the eighth embodiment of this invention. This horizontal type perpendicular thin-film magnetic head has the same structure as the thin-film magnetic head of the fourth embodiment shown in FIG. 6 except that this thin-film magnetic head has a thin film 15 provided at the interface between the main magnetic pole 9 and the return path 10. The thin film 15 is made of at least one type of magnetic or non-magnetic material selected from a group of a non-magnetic material, a magnetic material having a lower saturation magnetic flux density than those of the main magnetic pole 9 and the return path 10, and an antiferromagnetic material. The thickness of and the material for the thin film 15 are the same as those of the fifth embodiment.

This thin-film magnetic head has the same advantages as the thin-film magnetic head of the third embodiment shown in FIG. 5, as well as the same action and advantages as the thin-film magnetic head of the fifth embodiment due to the provision of the thin film 15.

This thin-film magnetic head has the same advantages as the thin-film magnetic head of the fourth embodiment shown in FIG. 6, as well as the same action and advantages as the thin-film magnetic head of the fifth embodiment due to the provision of the thin film 15 because of the provision of the non-magnetic layer 15, or the magnetic layer 15 having a lower saturation magnetic flux density than those of the magnetic layers 1a, 2a and 2b, or the antiferromagnetic layer 15.

Embodiment 9

In a combination of a thin-film magnetic head, which comprises a ring-shaped magnetic core made of Permalloy and a one-turn coil wound around the magnetic core and a longitudinal recording medium of a CoPt-based material, the parameters are set as follows:

| | | |
|---|---|---|
| inner circumferential length of the magnetic core surrounding the coil | Lc: | 5 μm |
| magnetic gap length | g: | 0.2 μm |
| magnetic gap depth | D: | 0.24 μm |
| saturation magntic flux density of the magnetic core | Bs: | 1 T |
| effective specific magnetic permeability of the magnetic core | μ: | 300 |
| spacing between the head and medium | d: | 0.03 μm |
| thickness of longitudinal recording layer | δ: | 0.03 μm |
| coercive force of the medium | Hc: | 159000 A/m (= 2000 Oe) | the magnetomotive force I needed to generate the average magnetic flux density Bav nearly equal to the saturation magnetic flux density Bs of the magnetic core in the magnetic gap when the recording current is supplied to the coil, is computed to be 15.7 mA·T (<0.1 A·T) from the equation (1). At this time, the intensity of the recording magnetic field in the longitudinal direction of the recording track at the point P on the bottom surface of the longitudinal recording layer directly below the magnetic gap is obtained to be 361,000 A/m (=4530 Oe) from the equation (3). It is apparent that this intensity is sufficient to make recording on the recording medium with the aforementioned coercive force. As apparent from the above, recording can be made on a recording medium having high coercive force, with sufficiently low magnetomotive force, as compared with the prior art.

Embodiment 10

In a combination of a perpendicular thin-film magnetic head, which comprises a magnetic core having a main magnetic pole made of Permalloy, a return path of a high magnetic permeability to be magnetically coupled to the main magnetic pole, and a coil surrounded by the magnetic core, and a perpendicular double-layered magnetic recording medium having a highly permeable layer and a perpendicular recording layer laminated on a substrate in the named order, with the parameters set as follows:

| | | |
|---|---|---|
| inner circumferential length of the magnetic core surrounding the coil | Lc: | 5 μm |
| spacing between the main magnetic pole and perpendicular recording layer | d: | 0.03 μm |
| thickness of the perpendicular recording layer | δ: | 0.05 μm |
| distance between the main magnetic pole and the perpendicular recording layer | S: | 0.08 μm (= d + δ) |
| interval between the main magnetic pole and return path at the position of the medium opposing face | Lb: | 2 μm |
| film thickness in the vicinity of the medium opposing face of the main magnetic pole | Tm: | 0.2 μm |
| saturation magnetic flux density of the main magnetic pole | Bs: | 1 T |
| effective specific magnetic permeability of the magnetic core | μ: | 300 |
| spacing between the head and medium | d: | 0.03 μm |
| thickness of perpendicular recording layer | | |
| thickness of perpendicular recording layer | δ: | 0.05 μm |
| coercive force of the medium | Hc: | 159000 A/m (= 2000 Oe) | the magnetomotive force I needed to provide the average magnetic flux density Bav nearly equal to the saturation magnetic flux density Bs of the main magnetic pole between the main magnetic pole and the perpendicular recording layer when the recording current is supplied to the coil, is computed to be 20.6 mA·T (<0.1 A·T) from the equation (2). At this time, the intensity of the recording magnetic field in the perpendicular direction to the recording surface at the point P on the bottom surface of the longitudinal recording layer directly below the main magnetic pole is obtained to be 446,00 A/m (=5600 Oe) from the equation (3). It is apparent that this intensity is sufficient to make recording on the recording medium with the aforementioned coercive force. As apparent from the above, recording can be made on a recording medium having high coercive force, with sufficiently low magnetomotive force, as compared with the prior art.

Although ten embodiments have been described herein, it should be apparent to those skilled in the art that this invention may be embodied in various other specific forms given below.

(1) The coil may be made of a high melting-point metal. Tungsten or molybdenum may be used as the high melting-point metal. The miniaturization of the magnetic head increases the density of the current flowing across the coil, and causes electromigration and heat generation, so that the coil is easily cut. This problem can however be overcome by the use of a high melting-point metal for the coil. The surface of the coil made of a high melting-point metal may be oxidized, forming an oxide film of a high melting-point metal. This allows a smooth magnetic path to be formed. Further, the high melting-point metal coil and the oxide film on the surface of that coil can provide magnetostatic coupling between the upper magnetic layer and the lower magnetic layer, so that the magnetic permeability can be maintained even though fine patterning.

Figure 11A:
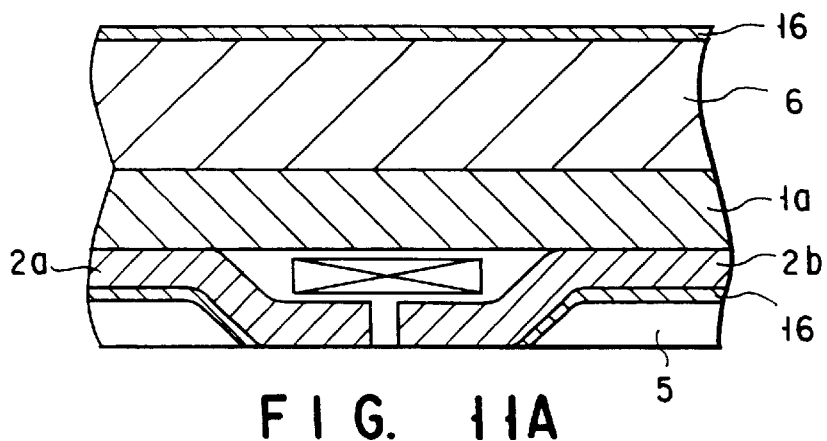
FIGS. 11A to 11C are cross-sectional views of a magnetic head showing where an antiferromagnetic film is located.
Figure 11B:
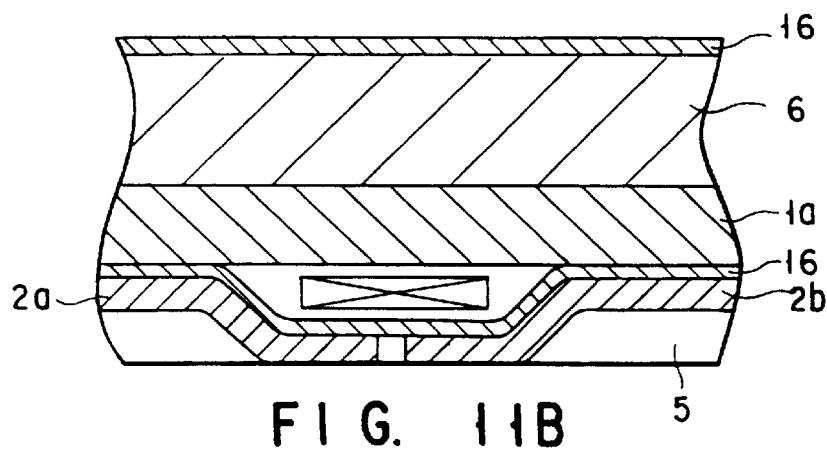
Figure 11C:
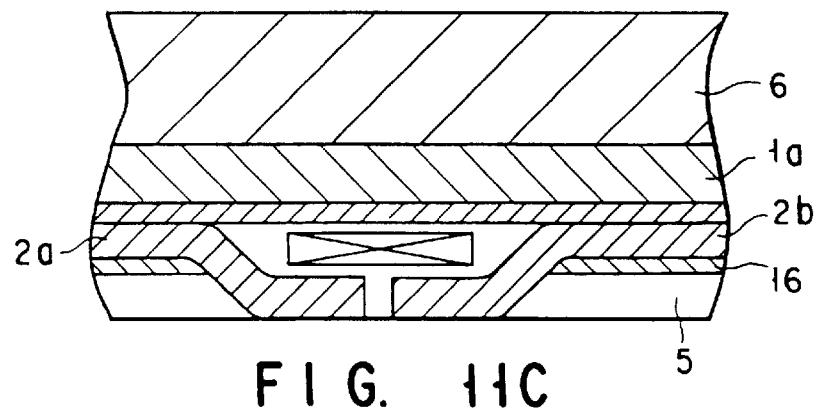

(2) The provision of an antiferromagnetic film 16 at the position as shown in FIGS. 11A to 11C permits the magnetic pole to be securely magnetized, thus reducing noise.

(3) A dummy projection may be provided at the peripheral portion of a protruding to-be-polished surface at the time of polishing the sliding surface of the magnetic head to increase the area of the to-be-polished portion, thereby improving the depth accuracy.

As described above, this invention has the following advantages.

(1) Since the magnetomotive force can be made significantly lower than that of the conventional head, it is easy to design the coil to have fewer turns, particularly, a single turn. This design simplifies the fabrication process and is excellent in mass production.

(2) As the head becomes very small as compared with the conventional head, a multi-channel structure becomes easier.

(3) Due to the fewer turns, the impedance of the head is reduced considerably. The rising time and falling time of the recording current become shorter, thus widening the recording frequency band accordingly.

(4) As the magnetomotive force and the impedance are reduced considerably, the power needed for recording can also be reduced significantly, thereby overcome the problem of the recording-current originated heat generation at the head portion. The reliability of the head is thus improved.

(5) Due to the head size considerably smaller than that of the conventional head, the thickness of the magnetic pole becomes on the sub-micron order (micron order in the prior art), so that the working precision in the thin-film etching process for the track width or the like is significantly improved and the fabrication of a thin-film magnetic head having a very narrow track width of 1 µm or below becomes significantly easy.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A perpendicular thin-film magnetic head comprising a magnetic core having a main magnetic pole and a return path of a high magnetic permeability to be magnetically coupled to said main magnetic pole, and a coil surrounded by said magnetic core, for accomplishing writing and reading when in use with a perpendicular double-layered magnetic recording medium having a highly permeable layer and a perpendicular recording layer laminated on a substrate in a named order, given that an inner circumferential length of said magnetic core surrounding said coil is Lc, a distance from a medium opposing face of said perpendicular thin-film magnetic head to a recording-layer side face of said highly permeable layer of said recording medium is S, an interval between said main magnetic pole and said return path at a position of said medium opposing face is Lb, a film thickness in a vicinity of said medium opposing face of said main magnetic pole is Tm, an average value of a density of a magnetic flux (unit: T (tesla)) generated toward said highly permeable layer from a distal end portion of said main magnetic pole, needed for sufficiently magnetizing said perpendicular recording layer, is Bav and an effective magnetic permeability of said magnetic core is $\mu$, wherein Lc, S, Lb and Tm are determined in such a manner that a magnetomotive force I needed for recording, expressed by a following equation (1), in a range of equal to or less than 0.1 A·T:

$$I = \frac{2\pi TmBav}{\mu \mathrm{Log}\{(L+2\pi Tm)/L\}} \quad (1)$$

wherein Log is a natural logarithm, L=Lc+2S+Lb, and variables in said equation (2) are expressed in SI units.

2. The perpendicular thin-film magnetic head according to claim 1, wherein Lc, S, Lb and Tm are determined such that said magnetomotive force I ranges from 0.001 A·T to 0.07 A·T.

3. The perpendicular thin-film magnetic head according to claim 1, wherein Lc, S, Lb and Tm are determined such that said magnetomotive force I ranges from 0.01 A·T to 0.07 A·T.

4. The perpendicular thin-film magnetic head according to claim 1, wherein a thin film or a thin-film lamination, made of at least one type of magnetic or non-magnetic material selected from a group of a non-magnetic material, a magnetic material having a lower saturation magnetic flux density than that of said magnetic core and an antiferromagnetic material, is provided at an interface between said main magnetic pole and said return path.

5. The perpendicular thin-film magnetic head according to claim 4, wherein said non-magnetic material is selected from the group consisting of $Al_2O_3$, $SiO_2$ and Cu, said magnetic material having a lower saturation magnetic flux density than that of said magnetic core is selected from the group consisting of CoZr-based series amorphous material and Parmalloy containing Nb or Rh, and said antiferromagnetic material is selected from the group consisting of FeMn, NiO and PtMn.

6. A magnetic recording/reproducing apparatus equipped with a recording magnetic head comprising a magnetic core having a main magnetic pole and a return path of a high magnetic permeability to be magnetically coupled to said main magnetic pole, and a coil surrounded by said magnetic core, and a reading magnetic head provided integrally with or separate from said recording magnetic head, for accomplishing writing and reading when in use with a perpendicular double-layered magnetic recording medium having a highly permeable layer and a perpendicular recording layer laminated on a substrate in a named order, given that an inner circumferential length of said magnetic core surrounding said coil of said recording magnetic head is Lc, a distance from a medium opposing face of a perpendicular head to a recording-layer side face of said highly permeable layer of said recording medium is S, an interval between said main magnetic pole and said return path at a position of said medium opposing face is Lb, a film thickness is a vicinity of said medium opposing face of said main magnetic pole is Tm, an average value of a density of a magnetic flux (unit: T (tesla)) generated toward said highly permeable layer from a distal end portion of said main magnetic pole, needed for sufficiently magnetizing said perpendicular recording layer, is Bav and an effective magnetic permeability of said magnetic core is $\mu$, wherein Lc, S, Lb and Tm are determined in such a manner that a magnetomotive force I needed for recording, expressed by a following equation (1), in a range of equal to or less than 0.1 A·T, and a magnetic field intensity Hy in a direction perpendicular to a main surface of said magnetic recording medium immediately below said main magnetic pole of said recording magnetic head being expressed by a following equation (2) and said magnetic field intensity Hy and coercive force Hc of said magnetic recording medium having a relation of Hy>Hc:

$$I = \frac{2\pi TmBav}{\mu \mathrm{Log}\{(L+2\pi Tm)/L\}} \quad (1)$$

where Log is a natural logarithm, L=Lc+2S+Lb, and variables in said equation (2) are expressed in SI units, and $$Hy = \frac{2Bs}{\pi \mu_0} \cdot \tan^{-1} \frac{t_w \cdot t_m}{4(d+\delta)\sqrt{(t_w/2)^2 + (t_m/2)^2 + (d+\delta)^2}} \quad (2)$$

where $t_m$ is a thickness of said main magnetic pole of said recording magnetic head, $t_w$ is a track width, Bs is a saturation magnetic pole necessary to generate a recording magnetic field needed for magnetizing said magnetic recording medium, $\mu_0$ is a magnetic permeability in vacuum, d is spacing between said recording magnetic head and said magnetic recording medium, and $\delta$ is a thickness of a recording layer of said magnetic recording medium, and wherein variables in said equation (2) are expressed in SI units.

7. The magnetic write/read apparatus according to claim 6, wherein Lc, S, Lb and Tm are determined such that said magnetomotive force I ranges from 0.001 A·T to 0.07 A·T.

8. The magnetic write/read apparatus according to claim 6, wherein Lc, S, Lb and Tm are determined such that said magnetomotive force I ranges from 0.01 A·T to 0.07 A·T.

9. The magnetic write/read apparatus according to claim 6, wherein a thin film or a multi-layered thin film, made of at least one type of magnetic or non-magnetic material selected from a group of a non-magnetic material, a magnetic material having a lower saturation magnetic flux density than that of said magnetic core and an antiferromagnetic material, is provided at an interface between said main magnetic pole and said return path.

10. The magnetic write/read apparatus according to claim 9, wherein said non-magnetic material is selected from the group consisting of $Al_2O_3$, $SiO_2$ and Cu, said magnetic material having a lower saturation magnetic flux density than that of said magnetic core is selected from the group consisting of CoZr-based series amorphous material and Parmalloy containing Nb or Rh, and said antiferromagnetic material is selected from the group consisting of FeMn, NiO and PtMn.

* * * * *